US010259401B2

(12) United States Patent
Tawada et al.

(10) Patent No.: US 10,259,401 B2
(45) Date of Patent: Apr. 16, 2019

(54) INTERIOR COMPONENT FOR VEHICLE

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Kazuhiro Tawada, Aichi-ken (JP); Michinori Kawasumi, Aichi-ken (JP); Daizo Morita, Aichi-ken (JP); Fumitaka Hirose, Aichi-ken (JP); Toshiya Tanizawa, Aichi-ken (JP); Masaaki Yamai, Aichi-ken (JP); Manabu Ohtsuka, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/642,771

(22) Filed: Jul. 6, 2017

(65) Prior Publication Data
US 2018/0022296 A1 Jan. 25, 2018

(30) Foreign Application Priority Data
Jul. 25, 2016 (JP) .................. 2016-145420

(51) Int. Cl.
*B60R 13/02* (2006.01)

(52) U.S. Cl.
CPC ...... *B60R 13/0243* (2013.01); *B60R 13/0206* (2013.01); *B60R 2013/0281* (2013.01); *B60R 2013/0293* (2013.01)

(58) Field of Classification Search
CPC ........... B60R 13/0243; B60R 13/0206; B60R 2013/0281; B60R 2013/0293
USPC ............................. 296/146.7, 1.08
See application file for complete search history.

(56) References Cited

U.S. PATENT DOCUMENTS 9,409,531 B1* 8/2016 Bailo .............. B60R 13/02
2006/0197356 A1* 9/2006 Catron ............ B60J 5/0468
296/146.7

FOREIGN PATENT DOCUMENTS

JP 5822113 11/2015

* cited by examiner

*Primary Examiner* — Joseph D. Pape
(74) *Attorney, Agent, or Firm* — Greenblum & Bernstein, P.L.C.

(57) ABSTRACT

An interior component for a vehicle includes a first board, a second board, and a position adjustment mechanism. The second board is mounted to the first board to cover a surface of the first board on an interior side of the vehicle and to be movable along the surface of the first board. The position adjustment mechanism includes an operating component mounted to the second board. The operating component is configured to transmit a force applied to the operating component to the first board to move the second board relative to the first board along the surface of the first board.

15 Claims, 13 Drawing Sheets

INTERIOR COMPONENT FOR VEHICLE

CROSS REFERENCE TO RELATED APPLICATION

This application claims priority from Japanese Patent Application No. 2016-145420 filed on Jul. 25, 2016. The entire contents of the priority application are incorporated herein by reference.

TECHNICAL FIELD

The present disclosure relates to an interior component for a vehicle.

BACKGROUND

Interior components for a vehicle include an instrument panel and a door trim that is disposed adjacent to the instrument panel.

The interior components adjacent to each other may form a design surface. If a positional relationship between the interior components varies due to an error in assembling the interior components together, surface continuity at a boundary between the interior components may decrease, which may ruin the appearance of the design surface.

SUMMARY

The present invention was made in view of the foregoing circumstances. An object is to provide an interior component for a vehicle, a position of which is adjustable relative to another interior component adjacent thereto.

The interior component for a vehicle includes a first board, a second board, and a position adjustment mechanism. The second board is mounted to the first board to cover a surface of the first board on an interior side of the vehicle and to be movable along the surface of the first board. The position adjustment mechanism includes an operating component mounted to the second board. The operating component is configured to transmit a force applied to the operating component to the first board to move the second board relative to the first board along the surface of the first board.

With the position adjustment mechanism, a position of the second board relative to the first board can be adjusted. The operating component is mounted to the second board disposed on the interior side of the vehicle. Therefore, the operating component is accessible from the interior side of the vehicle. Furthermore, the second board can be moved relative to the first board that is positioned relative to another interior component adjacent to the interior component in the vehicle to adjust the position of the second board relative to the other interior component.

According to a technology described herein, an interior component for a vehicle, a position of which is adjustable relative to another interior component adjacent thereto is provided.

DETAILED DESCRIPTION

Figure 1:
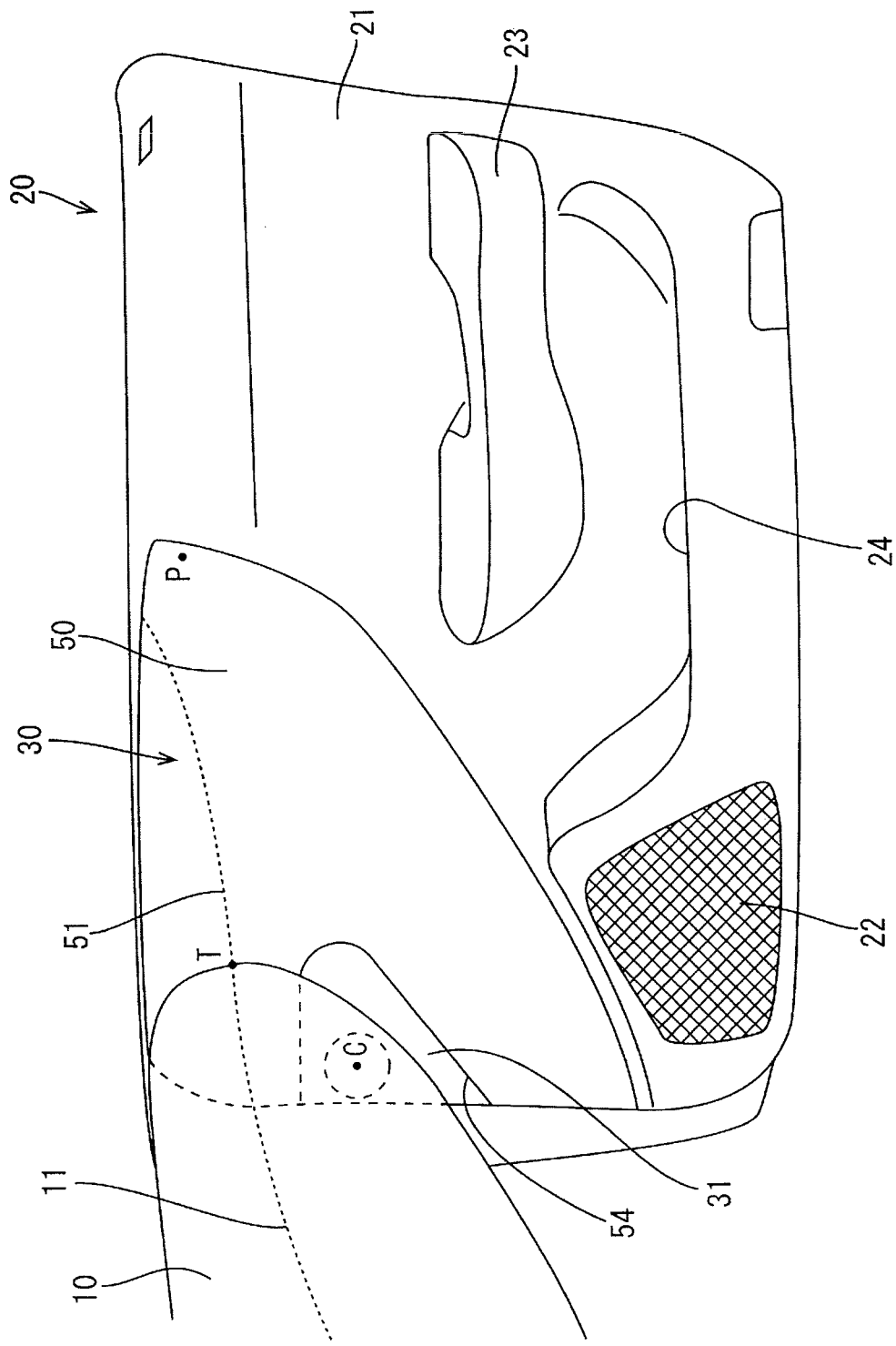
FIG. 1 is an elevation view of a door trim according to an embodiment.
Figure 2:
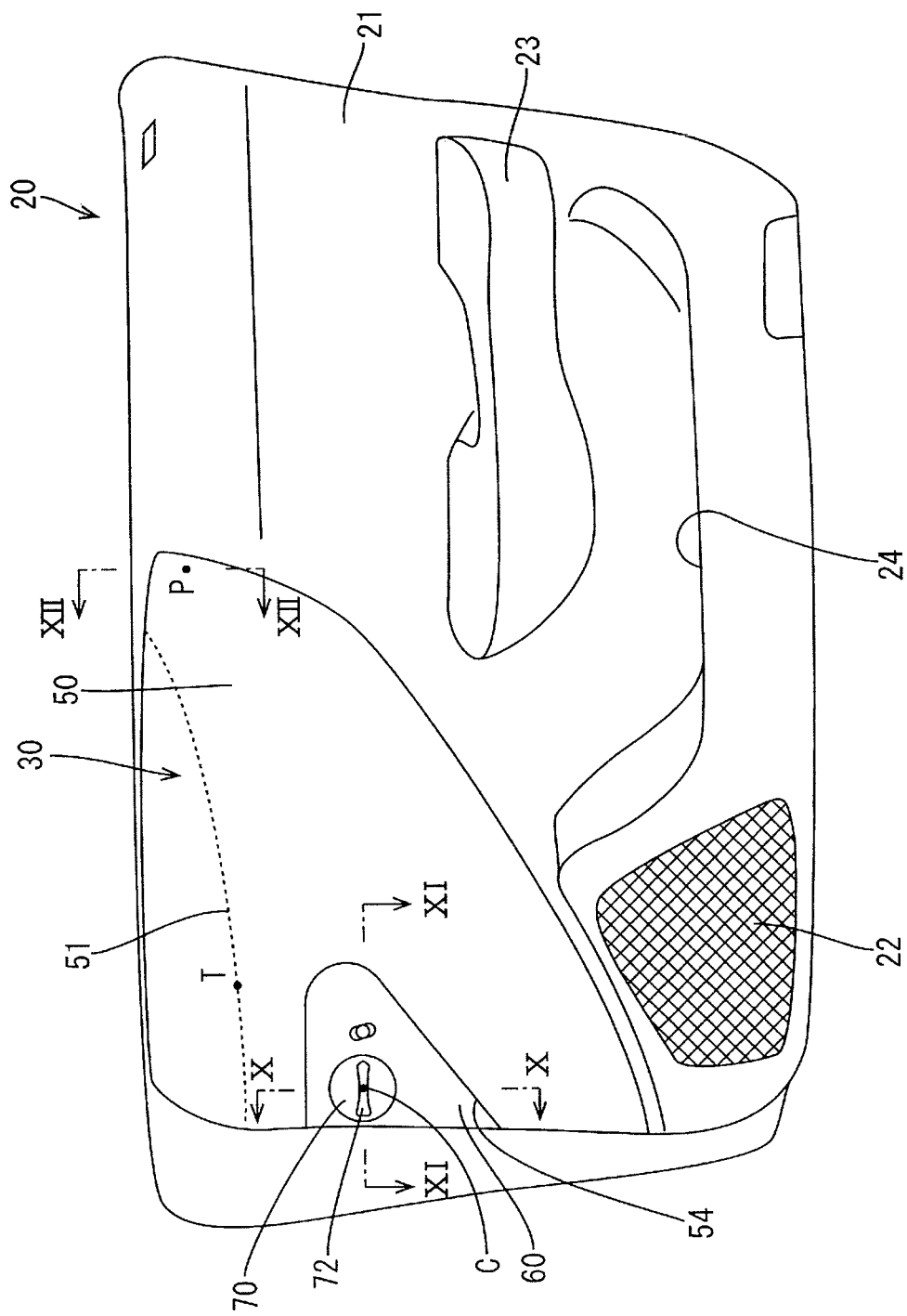
FIG. 2 is an elevation view of the door trim without a cover.

An embodiment will be described with reference to FIGS. 1 to 13. As illustrated in FIGS. 1 and 2, a door trim 20, which is an example of an interior component for a vehicle, includes a door trim body 21 and a middle board unit 30 that is mounted to the door trim body 21. The door trim 20 is disposed adjacent to an instrument panel 10. The door trim body 21 is made of synthetic resin such as polypropylene and formed in a plate shape. The door trim body 21 may include multiple boards (e.g., an upper board and a lower board). The door trim body 21 includes a speaker grille 22, an armrest 23, and a door pocket 24.

Figure 5:
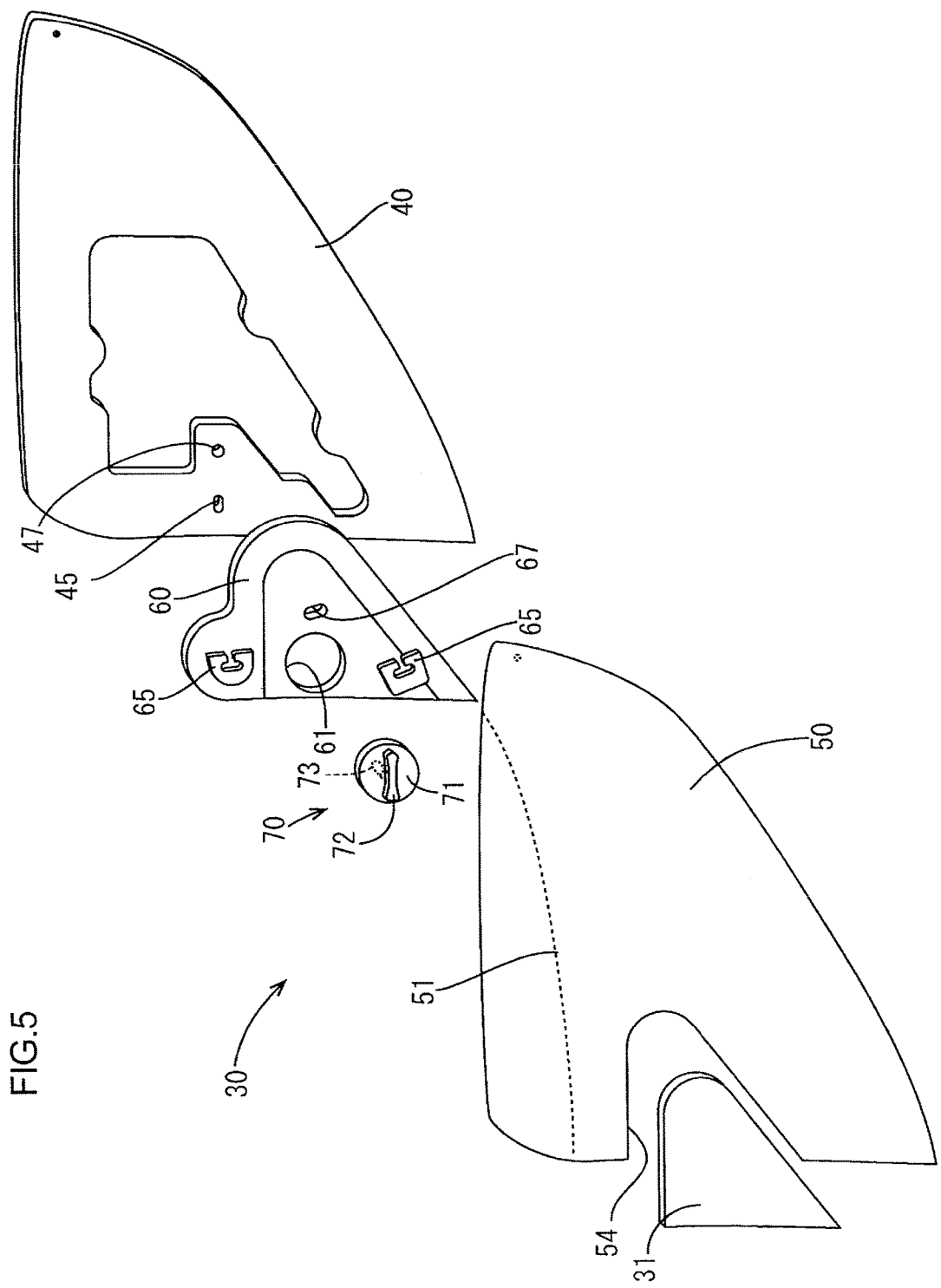
FIG. 5 is an exploded perspective view of a middle board unit.

The middle board unit 30 forms an upper front corner of the door trim 20. As illustrated in FIGS. 1 and 2, the middle board unit 30 is smaller than the door trim body 21. As illustrated in FIG. 5, the middle board unit 30 includes a fixed-side bracket 40 (a first board), a middle board 50 (a first component of a second board), a movable-side bracket 60 (a second component of the second board), a rotary operating knob 70 (an operating component), and a cover 31 (a third component of the second board). The fixed-side bracket 40 having a plate shape is fixed to the door trim body 21. The movable-side bracket 60 having a plate shape is fixed to the middle board 50 with an adhesive. The rotary operating knob 70 is attached to the movable-side bracket 60.

As illustrated in FIG. 1, the middle board 50 has a triangular shape in a front view. The middle board 50 includes a base and a skin in which a stitch line 51 is formed by sewing. The stitch line 51 and a stitch line 11 formed in the instrument panel 10 form a continuous line and thus design on the design surface has continuity.

Alignment of the stitch line 51 with the stitch line 11 may be difficult because of an error in mounting the instrument panel 10 or the door trim 20 to a vehicle without a position adjustment mechanism. If the stitch line 51 is positioned upper or lower than the stitch line 11, satisfactory appearance cannot be achieved for the interior of the vehicle. To align the stitch line 51 with the stitch line 11, the door trim 20 includes a position adjustment mechanism 32. The middle board 50 is mounted to the door trim body 21 via the fixed-side bracket 40 to be movable. A vertical position of the middle board 50 relative to the door trim body 21 is adjustable using the position adjustment mechanism 32 to align the stitch line 51 with the stitch line 11.

Figure 10:
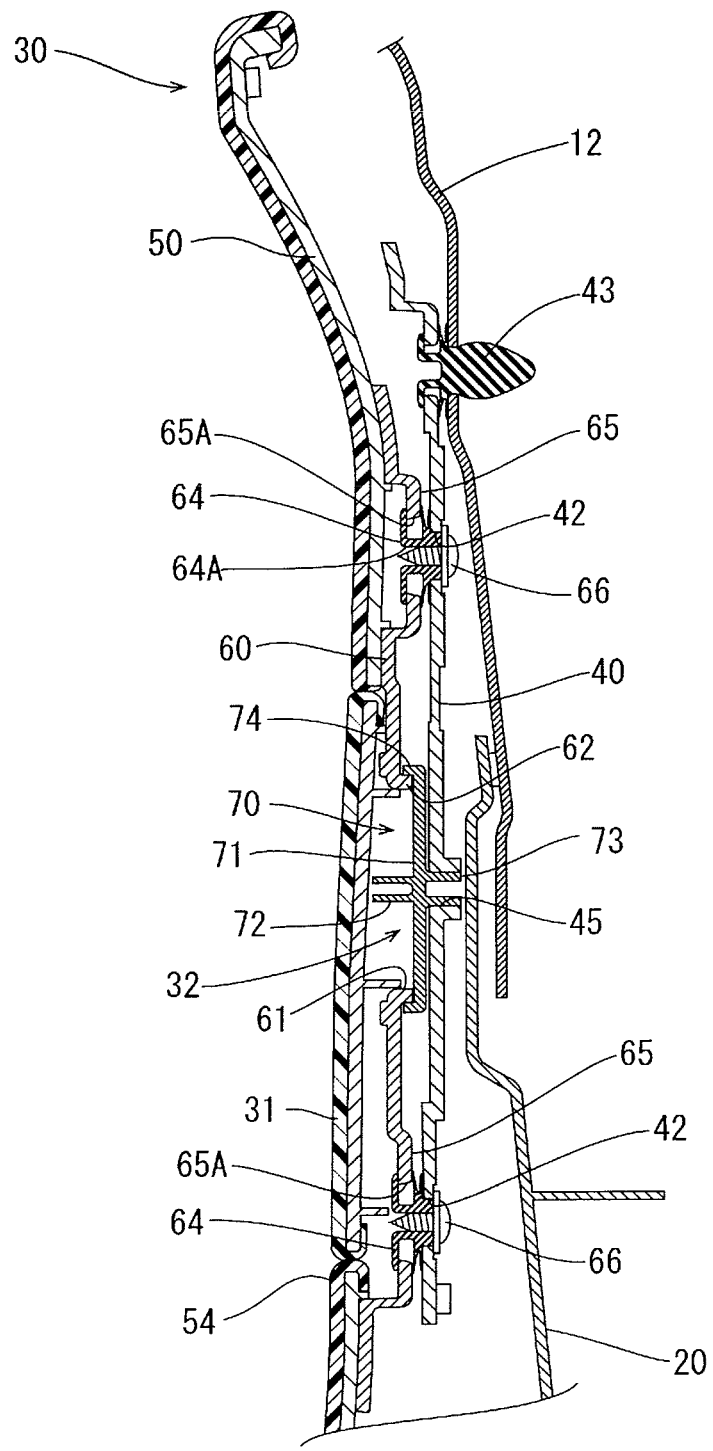
FIG. 10 is a cross-sectional view along line X-X in FIG. 2 illustrating the middle unit.

As illustrated in FIG. 5, the fixed-side bracket 40 has a triangular shape in an elevated view corresponding to the shape of the middle board 50. As illustrated in FIG. 10, the fixed-side bracket 40 includes a portion that overlaps the door trim body 21 and the overlapping portion is fixed to the door trim body 21 by a known fixing method (fixing with a clip or heat staking), which is not illustrated. The fixed-side bracket 40 is fixed to a door inner panel 12 with a clip 43. The middle board 50 is disposed to cover the fixed-side bracket 40 from an interior side of the vehicle and mounted to the fixed-side bracket 40 with a clip 53.

Figure 12:
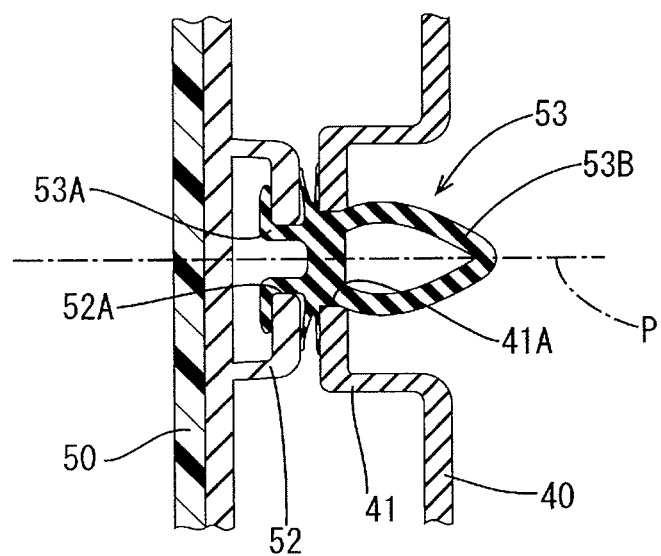
FIG. 12 is a cross-sectional view along line XII-XII in FIG. 2 illustrating an axis P of the middle board unit.

As illustrated in FIG. 12, the fixed-side bracket 40 includes a clip mounting base 41 that protrudes toward the interior of the vehicle at a position closer to the rear of the vehicle. The clip mounting base 41 includes a mounting hole 41A. The middle board 50 includes a clip mounting base 52 that protrudes toward an exterior of the vehicle at a position closer to the rear of the vehicle. The clip mounting base 52 includes a mounting hole 52A.

A clip 53 includes an upper stem 53A and a lower stem 53B. The upper stem 53A and the lower stem 53B are inserted in the mounting hole 52A of the clip mounting base 52 and the mounting hole 41A of the clip mounting base 41, respectively. With the clip 53, the middle board 50 is mounted to the fixed-side bracket 40 to be movable. The middle board 50 is configured to pivot on an axis P of the clip 53 relative to the fixed-side bracket 40. The axis P of the clip 53 extends in a width direction of the vehicle (a direction normal to a surface of the fixed-side bracket 40, the horizontal direction in FIG. 12). The middle board 50 is movable along a surface of the fixed-side bracket 40 (or the door trim body 21) on the interior side of the vehicle.

As illustrated in FIG. 5, the middle board 50 includes a void 54 at a position closer to the font of the vehicle. The movable-side bracket 60 is disposed to cover the void 54 from the interior side of the vehicle. As illustrated in FIG. 10, the movable-side bracket 60 includes clip mounting bases 65 on the exterior side of the vehicle. Clips 64 are mounted to the clip mounting bases 65, respectively. The fixed-side bracket 40 includes first insertion holes 42 and a second insertion hole 45. The first insertion holes 42 are at positions corresponding to the clip mounting bases 65, respectively. Screws 66 are inserted in the first insertion holes 42, respectively. Tails of the screws 66 are engaged with the respective clips 64.

The middle board 50 includes clip mounting bases formed on the surface on the exterior side of the vehicle. With the clip mounting bases and clips similar to the clip mounting bases 65 and the clips 64, the middle board 50 is attached to the fixed-side bracket 40. The middle board 50 is connected with the fixed-side bracket 40 with the clips and screws having the same configuration as the screws 66. The middle board 50 is restricted from moving toward the interior of the vehicle.

The clip mounting bases 65 include mounting holes 65A. The clips 64 include stems 64A that are inserted in the mounting holes 65A. A dimension of each stem 64A in the vertical direction (more specifically, in a moving direction of the middle board 50) is smaller than a longitudinal axis of the corresponding mounting hole 65A (see FIG. 7). When the stem 64A is set at the middle of the longitudinal axis of the mounting hole 65A, clearances S1 are provided between a top of the stem 64A and an inner wall of the mounting hole 65A and between a bottom of the stem 64A and the inner wall of the mounting hole 65A, respectively. The middle board 50 and the movable-side bracket 60 are movable within distance of the sum of the clearances S1 relative to the fixed-side bracket 40.

Figure 6:
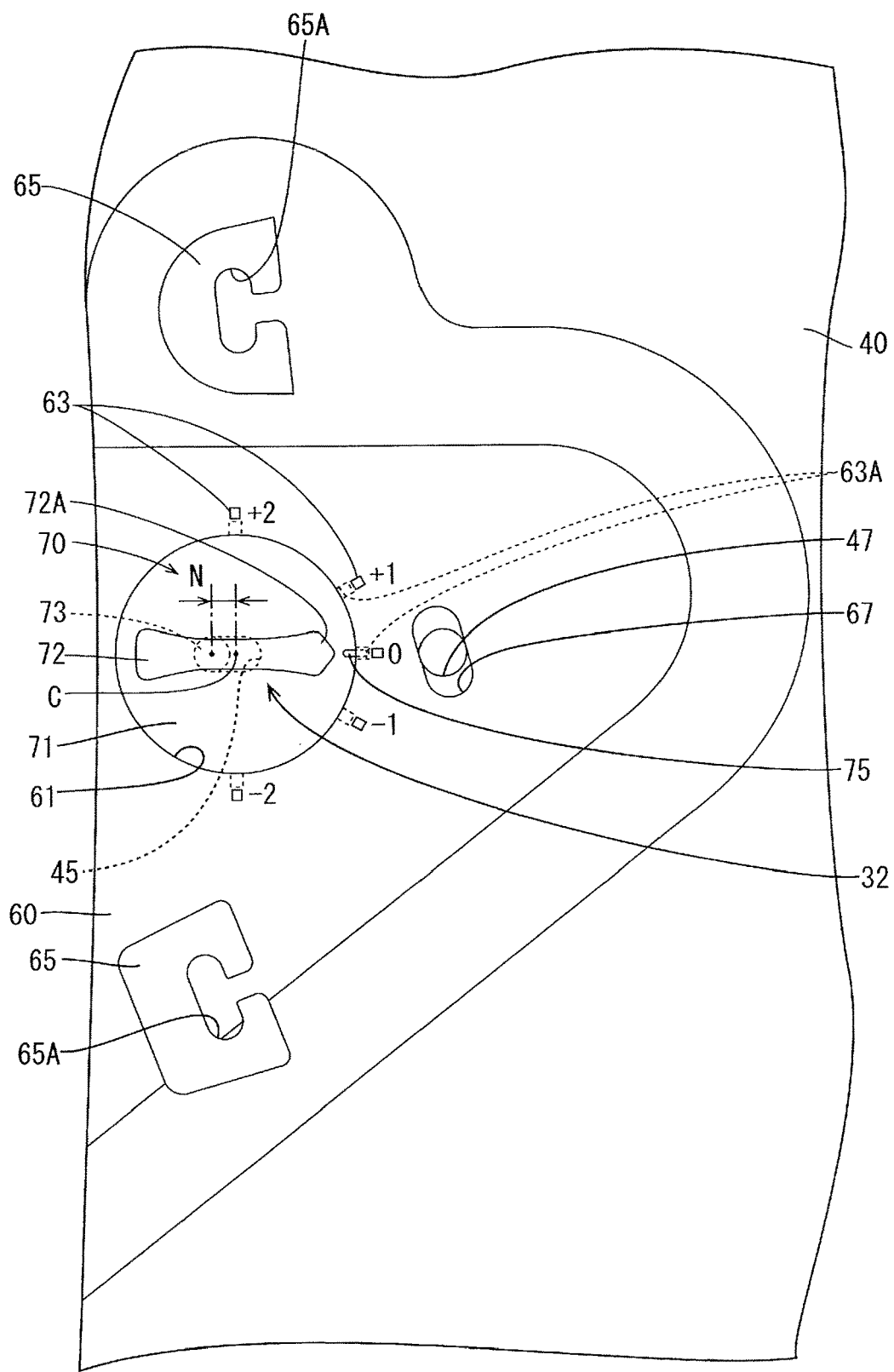
FIG. 6 is a magnified view illustrating a rotary operating knob and therearound.
Figure 7:
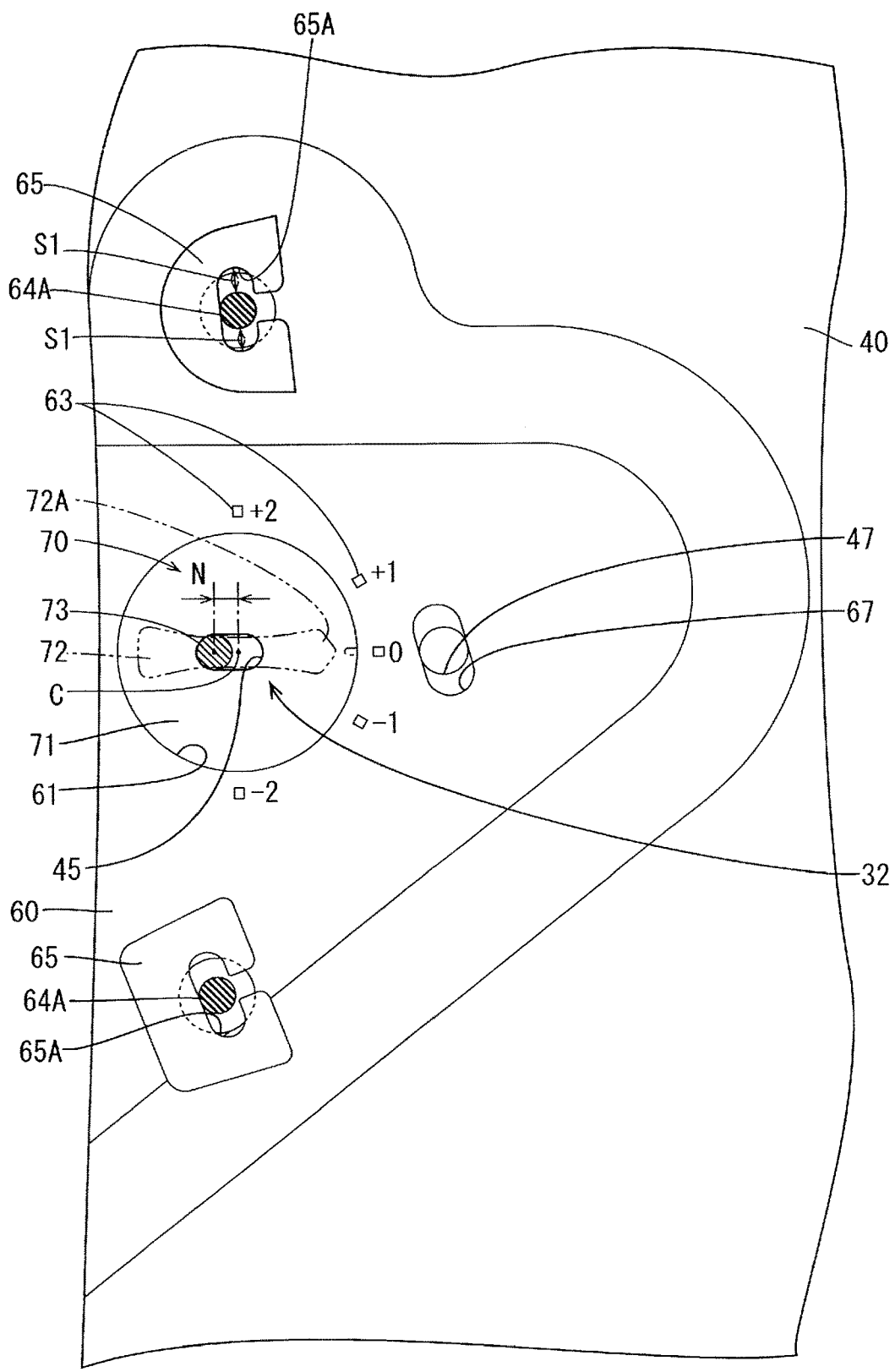
FIG. 7 is a magnified view illustrating the middle board unit when the rotary operating knob is in a default position.
Figure 11:
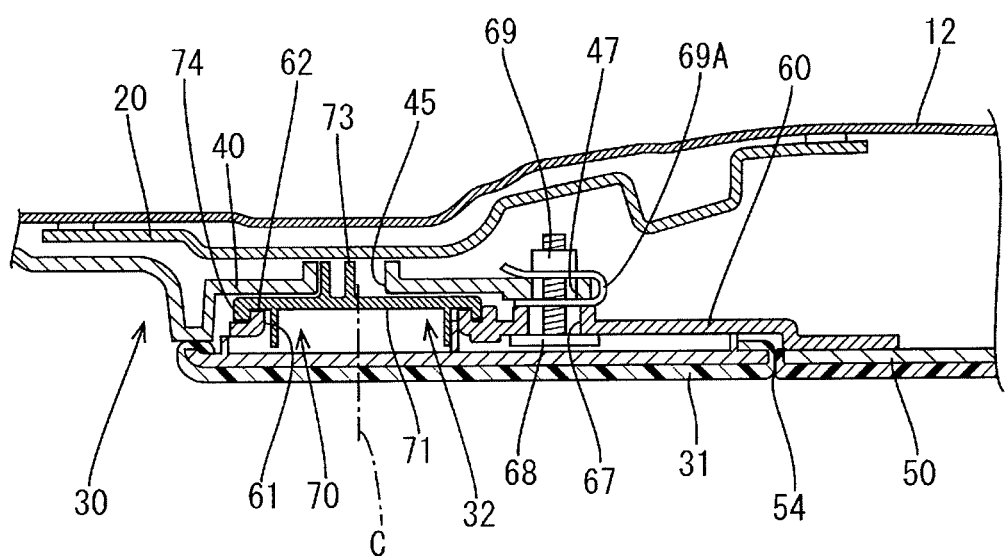
FIG. 11 is a cross-sectional view along line XI-XI in FIG. 2 illustrating the middle unit.

The movable-side bracket 60 includes a round through hole 61 and a locking portion 62 at a hole edge of the through hole 61. The locking portion 62 protrudes toward the exterior of the vehicle. As illustrated in FIG. 6 or 11, the rotary operating knob 70 includes a disk 71 (a baseplate), a holding portion 72, a stem 73, and a rim 74. The disk 71 is opposed to the surface of the fixed-side bracket 40 on the interior side of the vehicle to cover the surface of the fixed-side bracket 40 and to be movable along the surface of the fixed-side bracket 40. The disk 71 has a round shape and covers the through hole 61 from the exterior side of the vehicle. The holding portion 72 protrudes from a surface of the disk 71 on the interior side of the vehicle (a second surface of the baseplate farther from the surface of the first board). The stem 73 protrudes from a surface of the disk 71 on the exterior side of the vehicle (a first surface of the baseplate opposed to the surface of the first board). The stem 73 has a round columnar shape with a diameter slightly smaller than a transverse axis of the second insertion hole 45 perpendicular to the longitudinal axis of the second insertion hole 45. The rim 74 protrudes from an outer edge portion of the disk 71 toward the interior of the vehicle.

The position adjustment mechanism 32 has a function for moving the middle board 50 and the movable-side bracket 60 along the surface of the fixed-side bracket 40 by transmitting a force applied to the rotary operating knob 70 to the fixed-side bracket 40. As illustrated in FIG. 6, the position adjustment mechanism 32 includes the rotary operating knob 70 and the second insertion hole 45.

The locking portion 62 and the rim 74 have ring shapes (or arc shapes) along the periphery of the disk 71. The rim 74 is held to the locking portion 62. The rotary operating knob 70 is rotatable relative to the movable-side bracket 60 about an axis C at the center of the disk 71. The holding portion 72 has an elongated shape that extends in a radial direction of the disk 71. An end of the holding portion 72 includes a pointer 72A that has a triangular shape and points scale marks 63 at the hole edge of the through hole 61. The axis C extends in a direction normal to the surfaces of the fixed-side bracket 40 and the middle board 50 (the width direction of the vehicle). The holding portion 72 is disposed in the through hole 61.

The stem 73 is located a predefined distance N away from the axis C in a radial direction of the disk 71. The stem 73 is inserted in the second insertion hole 45 that is an oval hole having a longitudinal dimension (a longitudinal axis) in the front-rear direction of the vehicle.

As illustrated in FIG. 6, the movable-side bracket 60 includes an insertion hole 67 having an oval shape with a longitudinal axis smaller than the diameter of the disk 71 and oriented in the vertical direction or in a direction in which the middle board 50 pivots. The insertion hole 67 is located adjacent to the through hole 61. The insertion hole 67 is formed such that the center of the insertion hole 67 is at the same height as the center of the disk 71. The insertion hole 67 is oriented such that an angle the longitudinal axis of the insertion hole 67 relative to a first direction parallel to a longitudinal axis of the second insertion hole 45 is larger than an angle of the longitudinal axis of the insertion hole 67 relative to a second direction perpendicular to the first direction. The fixed-side bracket 40 includes a fixing hole 47 having a round shape. The fixing hole 47 is located at a position corresponding to the insertion hole 67. As illustrated in FIG. 11, a bolt 68 is passed through the fixing hole 47 and the insertion hole 67 with a head of the bolt 68 on the interior side of the vehicle. A U-shaped mounting piece 69A is attached to a portion of the fixed-side bracket 40 including the fixing hole 47 to sandwich the portion of the fixed-side bracket 40. The bolt 68 is engaged with a nut 69 that is integrally formed with the mounting piece 69A.

With the bolt 68 and the nut 69, the pivot of the middle board 50 relative to the fixed-side bracket 40 (the pivot on the axis P) is restricted to a predefined range. As illustrated in FIG. 11, the cover 31 is fitted in the void 54 of the middle board 50 to cover the rotary operating knob 70 and the bolt 68.

Next, a procedure for assembling the middle board unit 30 will be described. The movable-side bracket 60 is fixed to the middle board 50 with an adhesive. The rotary operating knob 70 is mounted to the movable-side bracket 60 from the exterior side of the vehicle. The fixed-side bracket 40 is mounted to the middle board 50 and the movable-side bracket 60 with the clip 64 and the screws 66. The stem 73 of the rotary operating knob 70 is inserted in the second insertion hole 45. The components of the middle board unit 30 other than the cover 31 and the bolt 68 are in place. The middle board unit 30 is mounted to the door trim body 21.

Figure 8:
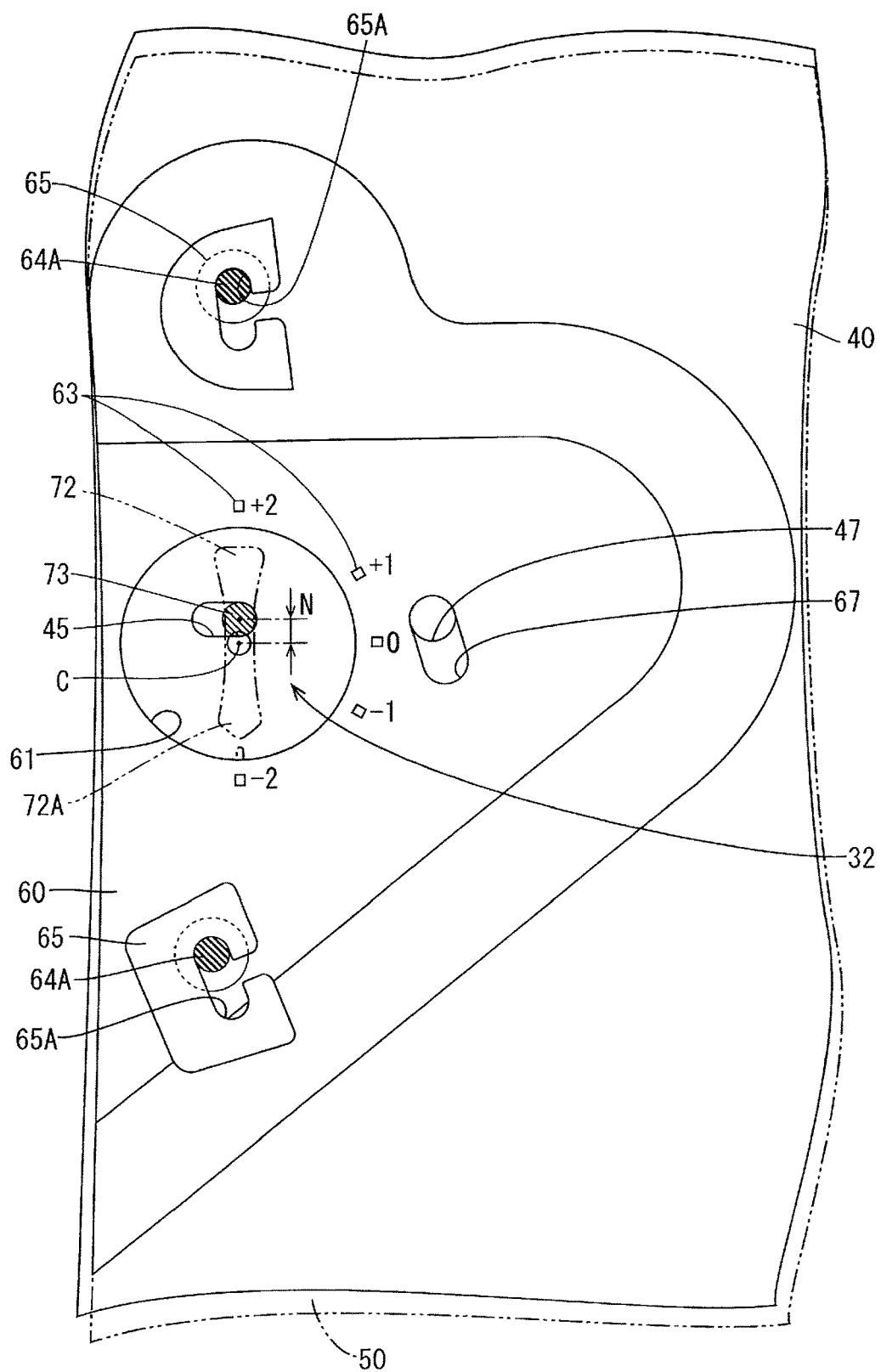
FIG. 8 is a magnified view illustrating the middle board unit after the rotary operating knob is turned clockwise from the default position.

Next, a procedure for adjusting a position of the stitch line 51 using the position adjustment mechanism 32 will be described. After the middle board unit 30 without the cover 31 is mounted to the door trim body 21 and the door trim body 21 is mounted to the door inner panel 12, the stitch line 51 of the door trim 20 is observed to determine whether a displacement of the stitch line 51 relative to the stitch line 11 of the instrument panel 10 is present. If the displacement is present, the rotary operating knob 70 is turned clockwise or counterclockwise from a default position illustrated in FIGS. 6 and 7. In the default position, the stem 73 of the rotary operating knob 70 is at the front end of the second insertion hole 45 with respect to the front-rear direction of the vehicle and at the same height as the axis C. When the rotary operating knob 70 is turned clockwise from the default position (by an external force), the stem 73 moves clockwise about the axis C to a position above the axis C as illustrated in FIG. 8.

Figure 3:
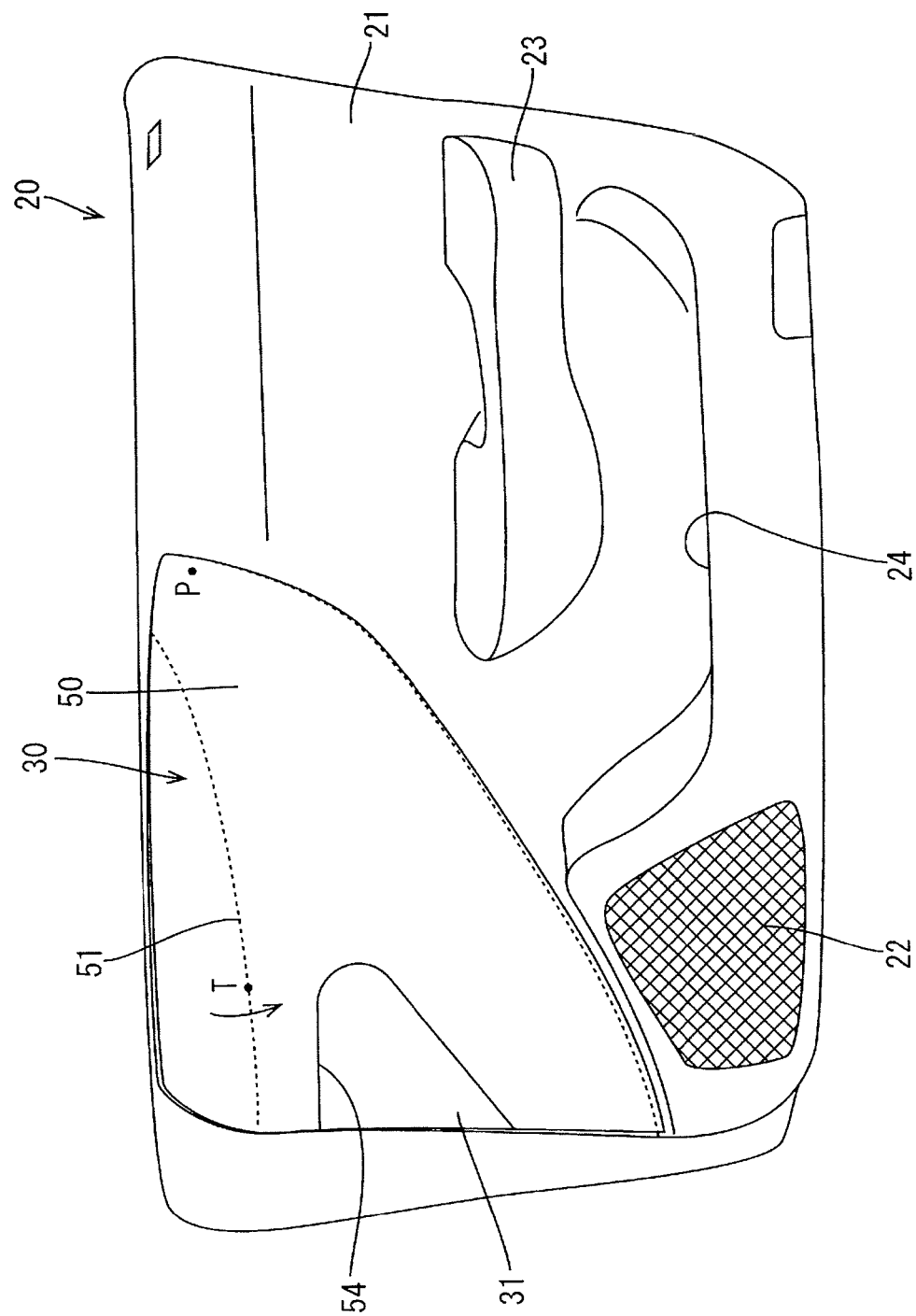
FIG. 3 is an elevated view illustrating a position of a middle board with a front end lowered.

As the rotary operating knob 70 turns clockwise, the stem 73 is pressed against the inner wall of the second insertion hole 45 from below (a force is applied to the first board in a direction in which the second board pivots). Namely, the stem 73 applies a force to the fixed-side bracket 40 (the first board) in a direction in which the movable-side bracket 60 (the second board) pivots. However, the fixed-side bracket 40 is fixed to the door trim body 21 and thus a reaction force is produced by application of the force to the fixed-side bracket 40 by the stem 73. The reaction force is exerted on the stem 73, that is, a downward force is applied to the movable-side bracket 60 and the middle board 50. As illustrated in FIG. 3, the middle board 50 pivots on the axis P and a front end of the middle board 50 moves downward (the second board turns along the surface of the first board). Namely, a positioning section T of the stitch line 51 adjacent to an end of the stitch line 11 (see FIG. 1) moves downward.

Figure 4:
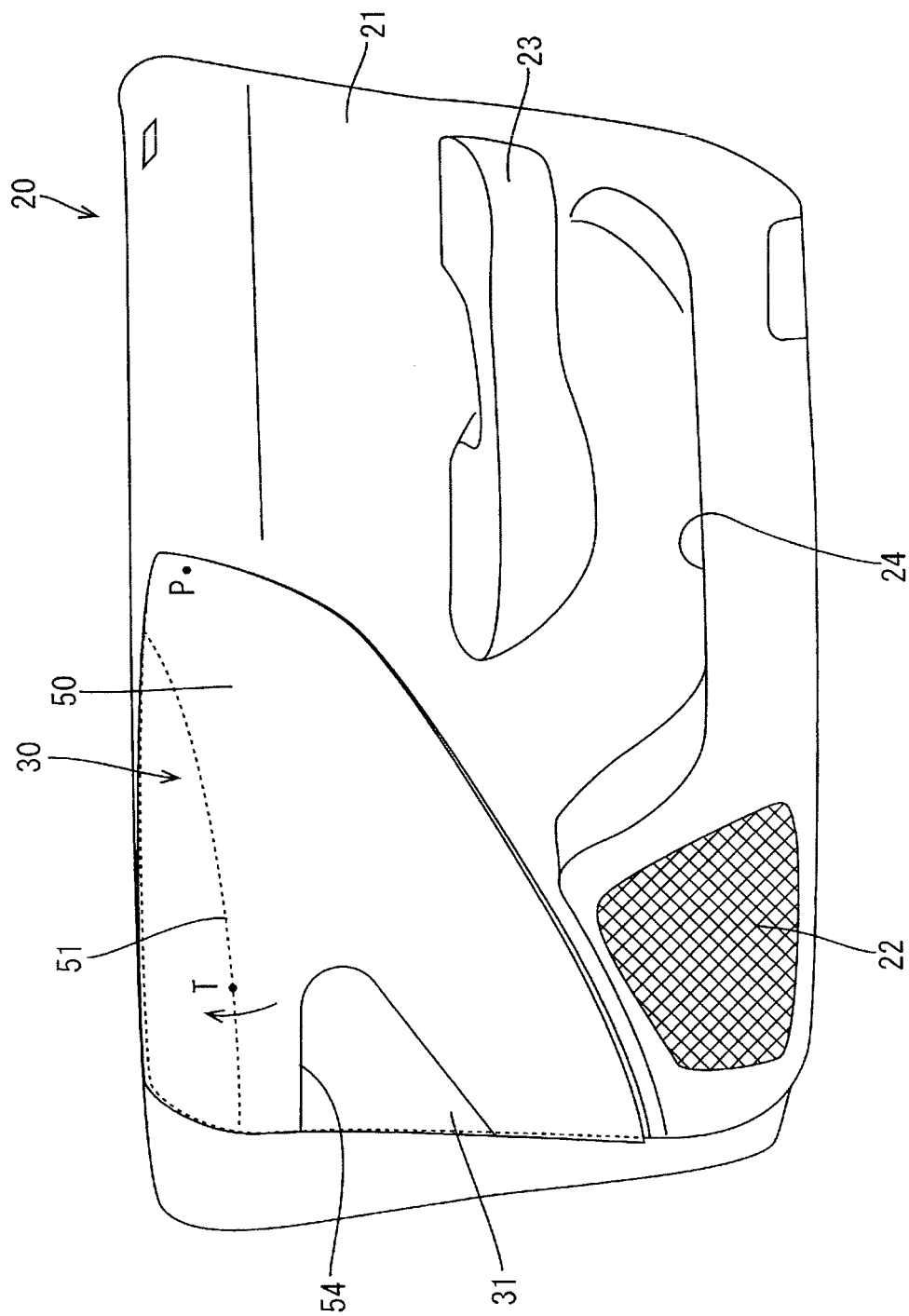
FIG. 4 is an elevated view illustrating a position of the middle board with a front end raised.
Figure 9:
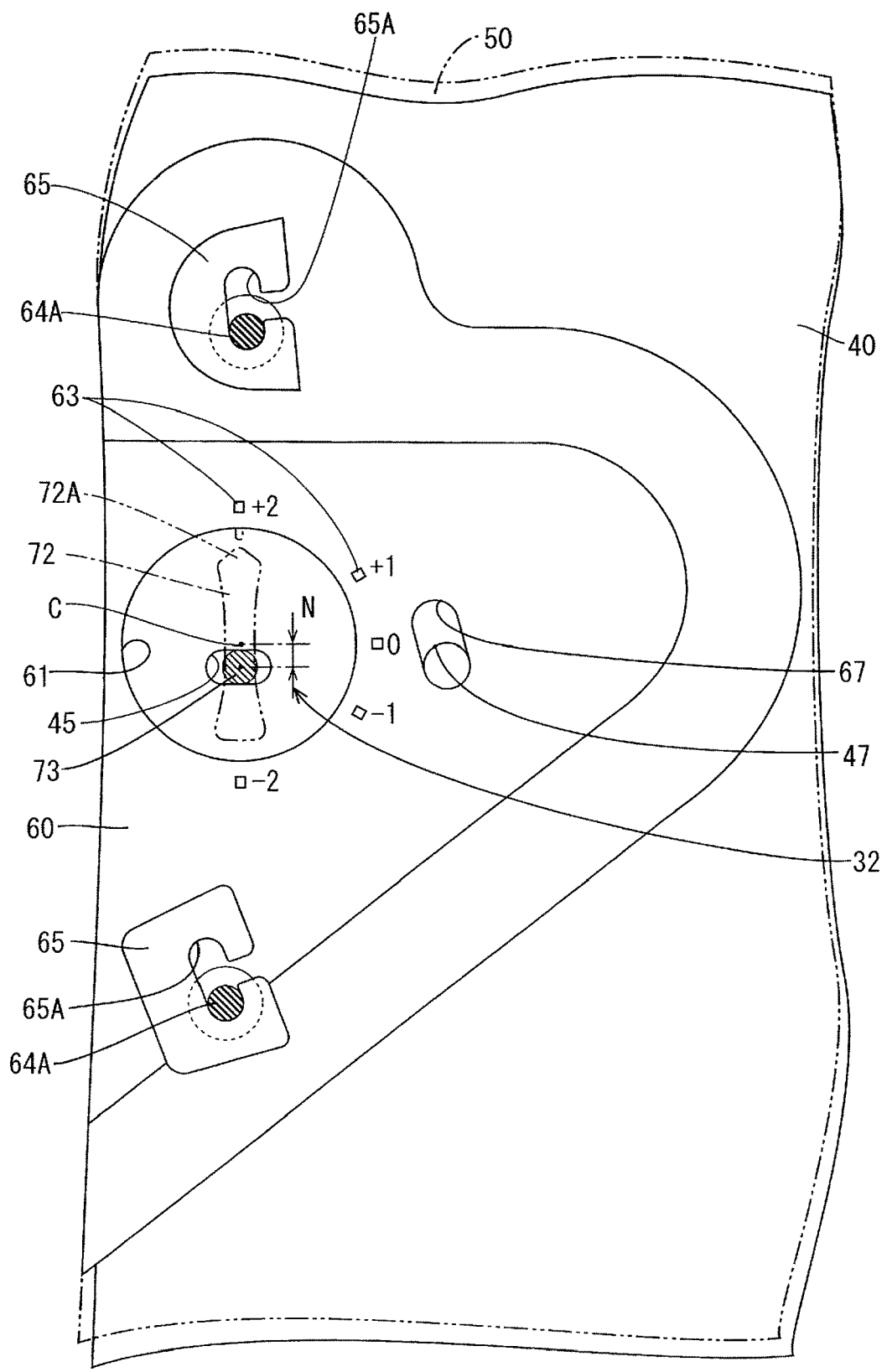
FIG. 9 is a magnified view illustrating the middle board unit after the rotary operating knob is turned counterclockwise from the default position.

When the rotary operating knob 70 is turned counterclockwise from the default position, the stem 73 moves counterclockwise about the axis C to a point below the axis C as illustrated in FIG. 9. As the rotary operating knob 70 turns counterclockwise, the stem 73 is pressed against the inner wall of the second insertion hole 45 from above. Namely, the stem 73 applies a downward force to the fixed-side bracket 40 and a reaction force is exerted on the stem 73, that is, an upward force is applied to the movable-side bracket 60 and the middle board 50. As illustrated in FIG. 4, the middle board 50 pivots on the axis P and the front end of the middle board 50 moves upward. Namely, the positioning section T of the stitch line 51 adjacent to an end of the stitch line 11 moves downward. A distance that the stem 73 pivots upward or downward on the axis C is proportional to an angle of turn of the rotary operating knob 70. By adjusting the angle of turn of the rotary operating knob 70, the distance that the stem 73 pivots upward or downward can be adjusted.

The position of the stitch line 51 relative to the stitch line 11 is adjusted by turning the rotary operating knob 70 clockwise or counterclockwise by an appropriate angle. When the position adjustment is complete, the bolt 68 is passed through the fixing holes 47 and the insertion hole 67 and fits the nut 69 to the bolt 68. With the bolt 68 in the fixing holes 47 and the insertion hole 67, the pivot of the middle board 50 relative to the fixed-side bracket 40 is restricted to the predefined range. The cover 31 is fitted in the void 54 and the assembly is complete.

Figure 13:
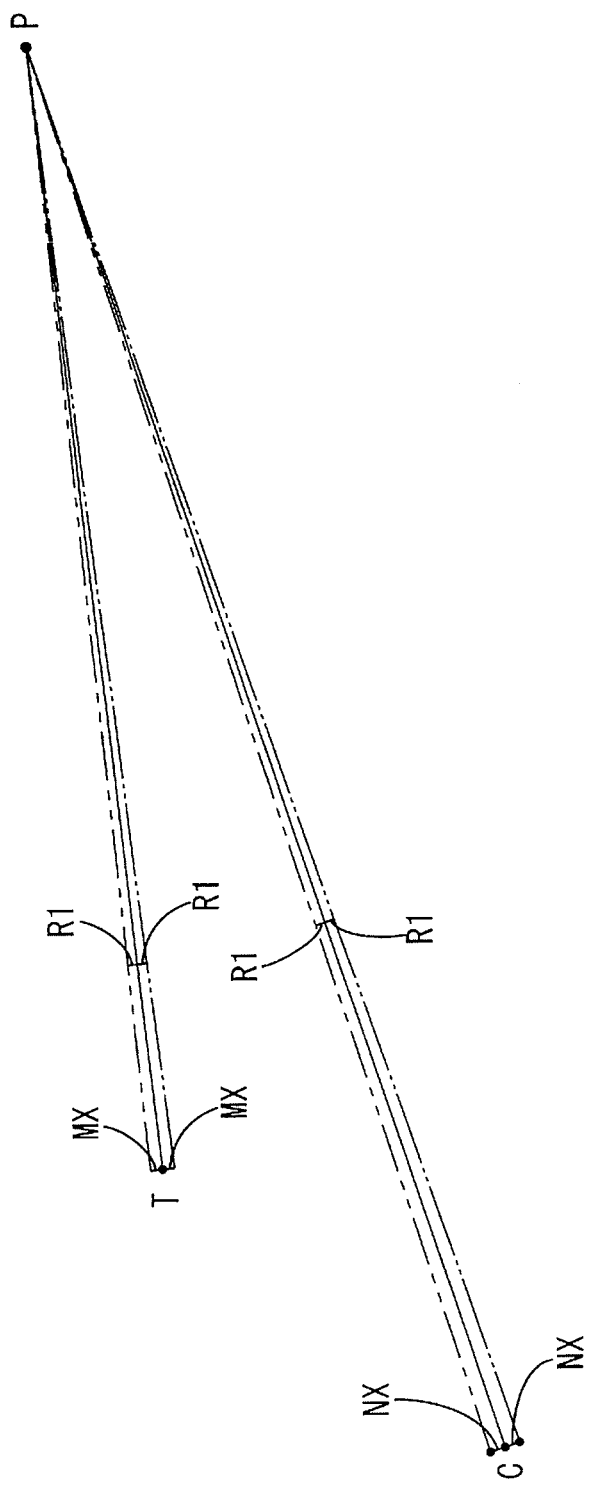
FIG. 13 is a schematic view illustrating variations of a protrusion and a positioning section T due to rotation of the rotary operating knob.

As illustrated in FIG. 13, an angle R1 of the pivot of the middle board 50 is: $R1=\tan^{-1}(NX/PC)$, where NX is a distance that the stem 73 moves (N is the maximum distance), PC is a distance between the axis P and the axis C. A distance MX that the positioning section T moves is: $MX=PT\cdot\tan R$, where PT is a distance between the axis P and the positioning section T.

A range of the distance MX of the positioning section T is defined based on an assembly error and a positional error of the stitch line 51. A range of the distance NX regarding the stem 73 is defined based on the distance MX regarding the positioning section T. The scale marks 63 are formed in the range of the distance NX. According to the configuration, the position of the positioning section T is easily adjustable by aligning the pointer 72A of the holding portion 72 with an appropriate one of the scale marks 63.

As illustrated in FIG. 6, the movable-side bracket 60 includes recesses 63A in a surface of the movable-side bracket 60 opposed to the surface of the fixed-side bracket 40 at positions corresponding to the scale marks 63. The scale marks 63 are aligned with the recesses 63A. The recesses 63A are formed at the hole edge of the through hole 61 and recessed toward the exterior side of the vehicle. The disk 71 of the rotary operating knob 70 includes a protrusion 75 at a position adjacent to the pointer 72A. The protrusion 75 is aligned with a tip of the pointer 72A (a vertex of the end of the holding portion). When the tip of the pointer 72A and any of the scale marks 63 are aligned, the protrusion 75 fits in one of the recesses 63A corresponding to the scale mark 63. When the protrusion 75 fits in the recess 63A during the turning of the rotary operating knob 70, a click sound occurs. This helps an assembly person for easy alignment of the pointer 72A with the scale mark 63. Therefore, the position of the movable-side bracket 60 can be easily altered to one of the predefined positions.

Next, effects of this embodiment will be described. With the position adjustment mechanism 32, the position of the middle board 50 relative to the fixed-side bracket 40 (or the door trim body 21) can be adjusted. Because the rotary operating knob 70 is mounted to the movable-side bracket 60 and accessible from the interior side of the vehicle, the assembly person can easily move the middle board 50 using the rotary operating knob 70 from the interior side of the vehicle. According to the configuration, after the fixed-side bracket 40 is positioned relative to the instrument panel 10, that is, the door trim body 21 is fixed to the door inner panel 12, the middle board 50 can be moved to adjust the position of the middle board 50 relative to the instrument panel 10.

The middle board 50 is mounted to the fixed-side bracket 40 to be pivotable on the axis P that extends along in the direction perpendicular to the surface of the fixed-side bracket 40. The position adjustment mechanism 32 is configured to apply a force to the fixed-side bracket 40 along the pivot direction of the middle board 50 (moment of the middle board 50 about the axis P).

When the position adjustment mechanism 32 applies the force to the fixed-side bracket 40 in the pivot direction of the movable-side bracket 60 after the fixed-side bracket 40 is fixed to the door trim body 21, the movable-side bracket 60 pivots on the axis P due to the reaction force. Namely, the movable-side bracket 60 can be moved relative to the fixed-side bracket 40. If the movable-side bracket 60 is mounted to the fixed-side bracket 40 to be slidable, it may be required to apply multiple forces to the movable-side bracket 60 at different points (e.g., two points at a right end and a left end) for smooth movement of the movable-side bracket 60 in the vertical direction. Therefore, the position adjustment mechanism 32 requires more complex configuration. According to the configuration of this embodiment in which the movable-side bracket 60 is mounted to the fixed-side bracket 40 to be pivotable, it is required to apply the force to the movable-side bracket 60 at one point (the inner edge of the through hole 61). The movable-side bracket 60 can be easily moved with the position adjustment mechanism 32 having the simple configuration.

The rotary operating knob 70 is mounted to the movable-side bracket 60 to be rotatable about the axis C that extends in the direction perpendicular to the surface of the movable-side bracket 60. The position adjustment mechanism 32 includes the second insertion hole 45 and the stem 73. The second insertion hole 45 is formed in the fixed-side bracket 40. The stem 73 is formed on the surface of the disk 71 on the exterior side of the vehicle and inserted in the second insertion hole 45. The stem 73 is off the axis C (or the center) of the rotary operating knob 70. While turning the rotary operating knob 70, the stem 73 is pressed against the inner wall of the second insertion hole 45 of the fixed-side bracket 40 and thus the middle board 50 moves relative to the fixed-side bracket 40 along the surface of the fixed-side bracket 40. In comparison to the configuration in which an operating knob slides, an area required for the rotary operating knob 70 can be reduced.

Another option to adjust the position of the stitch line 51 is to move the whole door trim 20 relative to the door inner panel 12. However, this option may reduce sealing between the door trim 20 and the door inner panel 12. In this embodiment, only the middle board 50, which is one component of the door trim 20, is moved. In comparison to the configuration in which the whole door trim 20 is moved, the sealing does not decrease. Furthermore, a weight of a component to be moved is smaller and thus only a smaller force is required to adjust the position of the stitch line 51.

Other Embodiments

The technology described herein is not limited to the above embodiments described above and the drawings. The following embodiments may be included in the technical scope of the present invention.

(1) The technology described herein may be applied to interior components other than the door rim, for example, an instrumental panel and a roof trim. Furthermore, the technology described herein may be applied to interior components of vehicles other than an automobile.

(2) The technology described herein may be applied to a position adjustment mechanism for adjusting a position of a front door trim relative to a position of a rear door trim or a position of the rear door trim relative to the front door trim.

(3) The middle board 50 may be mounted to the door trim body 21 to be movable.

(4) The fixed-side bracket 40 may be integrally formed with the door trim body 21 and provided as a single component. The movable-side bracket 60 may be integrally formed with the middle board 50 and provided as a single component.

(5) The middle board 50 may not include the stitch line 51. Namely, the position adjustment mechanism 32 may be used for aligning an upper edge of the middle board 50 with an upper edge of the instrument panel 10.

(6) The position adjustment mechanism 32 may be configured to slide the middle board 50 in the vertical direction relative to the fixed-side bracket 40.

(7) The rotary operating knob 70 may be configured to slide the movable-side bracket 60 in the vertical direction.

(8) The position adjustment mechanism 32 may be configured to move the front portion of the middle board 50 in a direction other than the vertical direction. The direction is not limited as long as the direction is along the surface of the middle board 50.

(9) The middle board 50 may be mounted to the fixed-side bracket 40 with a hinge pin to be pivotable.

(10) The rotary operating knob 70 may be mounted to the movable-side bracket 60 with a hinge pin to be rotatable.

The invention claimed is:

1. An interior component for a vehicle comprising:
   a first board;
   a second board mounted to the first board to cover a surface of the first board on an interior side of the vehicle and to be movable along the surface of the first board; and
   a position adjustment mechanism comprising an operating component mounted to the second board, wherein the operating component is configured to transmit a force applied to the operating component to the first board to move the second board relative to the first board along the surface of the first board, wherein
   the second board is mounted to the first board to be pivotable on an axis perpendicular to the surface of the first board, and
   the position adjustment mechanism is configured to apply a force to the first board along a direction in which the second board pivots to the first board.

2. An interior component for a vehicle comprising:
   a first board;
   a second board mounted to the first board to cover a surface of the first board on an interior side of the vehicle and to be movable along the surface of the first board; and
   a position adjustment mechanism comprising an operating component mounted to the second board, wherein the operating component is configured to transmit a force applied to the operating component to the first board to move the second board relative to the first board along the surface of the first board,
   wherein
   the operating component is mounted to the second board to be rotatable about an axis thereof perpendicular to the surface of the first board, the position adjustment mechanism includes an insertion hole formed in the first board and a protrusion formed on a surface of the operating component on a first board side and inserted in the insertion hole, the protrusion is off the axis of the operating component, and the second board is moved relative to the first board along the surface of the first board with a force applied to an inner wall of the insertion hole of the first board by the protrusion through a rotation of the operating component.

3. An interior component for a vehicle comprising:
a body positioned relative to another interior component adjacent to the interior component in the vehicle;
a first board smaller than the body and fixed to a surface of the body on an interior side of the vehicle;
a second board mounted to a surface of the first board on the interior side of the vehicle to cover the surface of the first board and to be movable along the surface of the first board; and
an operating component mounted to the second board to be movable relative to the second board by an external force, the operating component being configured to apply a force to the first board during movement of the operating component caused by the external force, wherein
the second board is configured to be moved by a reaction force of the first board exerted on the second board during application of the force to the first board by the operating component.

4. The interior component according to claim 3, wherein
the first board includes an insertion hole having an oval shape with a longitudinal axis in a horizontal direction of the vehicle,
the operating component comprises a baseplate, a stem, and a holding portion,
the baseplate is opposed to the surface of the first board,
the operating component is configured to rotate about a center of the baseplate,
the stem protrudes from a first surface of the baseplate opposed to the surface of the first board at a position off the center of the baseplate and inserted in the insertion hole,
the stem has a round columnar shape with a diameter slightly smaller than a transverse axis of the insertion hole perpendicular to the longitudinal axis, and
the holding portion protrudes from a second surface of the baseplate farther from the surface of the first board.

5. The interior component according to claim 4, further comprising a fixing member including at least a portion having a round columnar shape, wherein
the first board includes a fixing hole having a round shape with a diameter slightly larger than a diameter of the portion of the fixing member,
the second board includes an insertion hole having an oval shape at a position corresponding to the fixing hole, and
the portion of the fixing member is passed through the fixing hole of the first board and the insertion hole of the second board.

6. The interior component according to claim 4, wherein
the baseplate has a disk shape,
the second board includes a round hole at a position corresponding to the baseplate,
the holding portion has an elongated shape that extends in a radial direction of the baseplate,
the holding portion is disposed in the round hole of the second board,
the operating component further comprises a protrusion that protrudes from the second surface of the baseplate at a position adjacent to an end of the holding portion and closer to an edge of the baseplate than the end of the holding portion, and
the second board includes a plurality of recesses in a surface opposed to the surface of the first board at a hole edge of the round hole for receiving the protrusion of the operating component.

7. The interior component according to claim 6, wherein
the insertion hole of the second board has a longitudinal dimension smaller than a diameter of the baseplate,
the insertion hole is formed such that a center thereof is at the same height as the center of the baseplate, and
the insertion hole is oriented such that an angle of a longitudinal axis of the insertion hole relative to a first direction parallel to a longitudinal axis of the insertion hole of the first board is larger than an angle of the longitudinal axis of the insertion hole relative to a second direction perpendicular to the first direction.

8. The interior component according to claim 6, wherein
the end of the holding portion has a triangular shape,
the protrusion of the operating component is aligned with a vertex of the end of the holding portion, and
the second board further comprises scale marks aligned with the recesses, respectively.

9. The interior component according to claim 3, wherein
the second board comprises a first component, a second component, and a third component,
the first component includes a void at a position corresponding to the operating component,
the second component is mounted to the first board and the first component,
the operating component is mounted to the second component to be movable relative to the second component by the external force,
the second component is configured to be moved by the reaction force of the first board,
the third component is fitted in the void of the first component, and
the first component and the third component in combination entirely cover the first board and the second component.

10. The interior component according to claim 9, wherein
the first board includes an insertion hole having an oval shape with a longitudinal axis in a horizontal direction of the vehicle,
the operating component comprises a baseplate, a stem, and a holding portion
the baseplate is opposed to the surface of the first board,
the operating component is configured to rotate about a center of the baseplate,
the stem protrudes from a first surface of the baseplate opposed to the surface of the first board at a position off the center of the baseplate and inserted in the insertion hole,
the stem has a round columnar shape with a diameter slightly smaller than a transverse axis of the insertion hole perpendicular to the longitudinal axis such that the stem closely fits the insertion hole with respect to the transverse axis of the insertion hole, and
the holding portion protrudes from a second surface of the baseplate farther from the surface of the first board.

11. The interior component according to claim 10, further comprising a fixing member including at least a portion having a round columnar shape, wherein
the first board includes a fixing hole having a round shape, the second component includes an insertion hole having an oval shape at a position corresponding to the through hole, and the portion of the fixing member is passed through the fixing hole and the insertion hole.

12. The interior component according to claim 10, wherein the baseplate has a disk shape, the second component includes a round hole having a round shape along an outline of the baseplate at a position corresponding to the operating component, the holding portion has an elongated shape that extends in a radial direction of the baseplate, the holding portion is disposed in the round hole of the second component, the operating component further comprises a protrusion that protrudes from the second surface of the baseplate at a position adjacent to an end of the holding portion and closer to an edge of the baseplate than the end of the holding portion, and the second component includes a plurality of recesses in a surface opposed to the surface of the first board at a hole edge of the round hole for receiving the protrusion of the operating component.

13. The interior component according to claim 12, wherein the insertion hole of the second component has a longitudinal dimension smaller than a diameter of the baseplate, the insertion hole is formed such that a center thereof is at the same height as the center of the baseplate, and the insertion hole is oriented such that an angle of a longitudinal axis of the insertion hole relative to a first direction parallel to a longitudinal axis of the insertion hole of the first board is larger than an angle of the longitudinal axis of the insertion hole relative to a second direction perpendicular to the first direction.

14. The interior component according to claim 12, wherein the end of the holding portion has a triangular shape, the protrusion of the operating component is aligned with a vertex of the end of the holding portion, and the second component further comprises scale marks aligned with the recesses, respectively.

15. The interior component according to claim 1, wherein the operating component is mounted to the second board to be rotatable about an axis thereof perpendicular to the surface of the first board, the position adjustment mechanism includes an insertion hole formed in the first board and a protrusion formed on a surface of the operating component on a first board side and inserted in the insertion hole, the protrusion is off the axis of the operating component, and the second board is moved relative to the first board along the surface of the first board with a force applied to an inner wall of the insertion hole of the first board by the protrusion through a rotation of the operating component.

* * * * *